United States Patent [19]

Tsai

[11] 4,013,838
[45] Mar. 22, 1977

[54] TELEPHONIC ENQUIRY SYSTEM

[75] Inventor: Maw-Kuei Tsai, Santa Clara, Calif.

[73] Assignee: Tonix Corporation, Santa Clara, Calif.

[22] Filed: Apr. 5, 1976

[21] Appl. No.: 673,878

[52] U.S. Cl. .......................... 179/2 A; 179/16 EA; 179/16 EC

[51] Int. Cl.² ...................................... H04M 11/10

[58] Field of Search ............... 179/2 A, 2 R, 2 DP, 179/16 E, 16 EA, 16 EC, 84 R, 84 VF, 6 E; 328/164

[56] References Cited

UNITED STATES PATENTS

| 3,879,583 | 4/1975 | Rooks | 179/16 E |
| 3,927,264 | 12/1975 | Fish | 179/16 E |
| 3,935,392 | 1/1976 | Smith | 179/16 EA |
| 3,935,994 | 2/1976 | Darvishian | 179/1 H |

Primary Examiner—Kathleen H. Claffy
Assistant Examiner—Joseph A. Popek
Attorney, Agent, or Firm—Limbach, Limbach & Sutton

[57] ABSTRACT

This system allows remote enquiry of the status of a condition over the telephone transmission lines by sending a code number with the telephone and specifically includes means for both decoding multifrequency telephone signals and detecting the number of dial pulses. With respect to the dial pulses, it qualifies each pulse as valid or invalid by comparing its amplitude with that of a preceding, known valid pulse. The dial telephone switch break time requirements are used to reject leading noises and to locate the leading valid pulse of a given train. Once the valid leading pulse is identified, the system uses a sequential timing control network to identify the time intervals during which valid input pulses are expected and thereby rejects noises occurring between valid pulses. In one particular application of the system, the presence or absence of mail in a specified mailbox of a group of mailboxes may be interrogated by a subscriber to the system remotely over the telephone lines and a verbal response is automatically generated over the telephone lines to the subscriber to tell him whether or not there is mail present in his mailbox.

10 Claims, 22 Drawing Figures

FIG. 3
DIAL PULSE PREPROCESSOR

FIG. 4

FIG. 5  DIAL PULSE COUNTER LOGIC DIAGRAM

FIG. 6

TIMING MASKS AND INPUT WAVEFORMS TO DPC

TELEPHONIC ENQUIRY SYSTEM

BACKGROUND OF THE INVENTION

The present invention relates to a remote enquiry system using telephone transmission lines, and more particularly to a dial pulse detector for use in such a system.

It is sometimes desirable to remotely control electrical apparatus or make automated enquiry of the status of a given condition using ordinary telephone lines and controlling signals originated by the operation of the telephone instrument itself. When using the so-called multifrequency, pushbutton or Touch Tone type telephone instrument, this can be done relatively easily by simply arranging a series of band pass filters at the receiving end to decode the different frequency signals and convert them into digital or decimal units. However, when using a dial type telephone instrument, signals are generated by the making and breaking of the switch in the dial telephone. These signals, after amplification in the telephone transmission system, appear at the receiving end as a series of spike pulses representing the closing and opening of the switch at the dial instrument. Unfortunately, noise pulses on the transmission line may exceed in amplitude the actual pulses produced by the dial instrument. This makes the interpretation and reconstruction of the dial telephone pulses extremely difficult.

Several types of prior art systems have attempted to reconstruct the signal information supplied by the dial telephone pulses by establishing amplitude threshhold levels which discriminate out the noise. Typically, such systems rely on the assumption that once a telephone connection is established, the amplitude of the dial pulse information signals will exceed the amplitude of the noise signals. See, for example, U.S. Pat. No. 3,927,264. Unfortunately, this is not always true and not only the amplitude of the pulses in a given connection may vary, but even the amplitudes of the pulses in the same train of pulses may vary. Furthermore, the degree and manner of such variations may be drastically different from one pulse train to another. For certain forms of input pulse trains at the receiving end it is, therefore, not possible to choose a proper percentage of the peak pulse amplitude to discriminate out noises while receiving the weak information signals.

One type of prior art system attempts to overcome this problem by using a timing "window" circuit which relies on the fact that the pulse generated by the breaking of the dial telephone switch contacts will be followed by a pulse representing the making of the same switch contacts within a predetermined period of time which is established by the telephone company standards. This type of prior art system is described in U.S. Pat. Nos. 3,879,583 and 3,935,392. The system utilizes logic elements to only count pairs of pulses which occur in a predetermined planned relationship to each other. The defect of prior art systems of this type is that they assume that no noise pulses of any significance will occur between a valid pair of pulses. If such a noise pulse does occur during the break time in such systems, they will miscount the pulses. This situation might occur for trailing pulses of a pulse train due to reduced signal level. Furthermore, the systems described in U.S. Pat. Nos. 3,879,583 and 3,935,392 contain no provision to verify the time requirements between successive breaks of the dial type switch, nor are any means provided for detecting the end of the given pulse train.

SUMMARY OF THE INVENTION

The above and other disadvantages of prior art telephonic remote enquiry systems and dial pulse detectors are overcome by the present improved telephonic remote enquiry system of the type which is remotely activated by a code number transmitted by the calling party which is received as a pulse train of discrete pulses or as multifrequency signals over a telephone transmission line. The multifrequency signals are generated by a Touch Tone type push button telephone whereas the discrete pulses are produced by the making and breaking of switch contacts of a dial type telephone. The system is capable of alternatively decoding the multifrequency signals or detecting the discrete pulses and converting them into a digitally coded signal corresponding to the code number. The improvement of the invention is in the means for detecting the discrete pulses generated by a dial type telephone and includes first means for detecting the first leading pulse of a train by checking whether the next subsequent pulse occurs within a predetermined time period thereafter and second means for qualifying all subsequent pulses as valid if their amplitudes exceed a first fixed percentage of the amplitude of the immediately preceding pulse. Third means for restarting the first means if the amplitude of the next valid pulse occurs before the expiration of the predetermined period of time following the receipt of the first leading pulse. The third means repeats this procedure in iterative fashion until the first leading pulse is finally determined. Fourth means are provided for generating a digital output signal representative of the count of pairs of valid pulses which occur with predetermined timed relationships with respect to the finally determined leading pulse. The count in the fourth means represents the transmitted code number.

The use of the first, second, third and fourth means allows the rejection of both leading noise pulses and noise pulses occurring between valid signal pulses.

The system further includes interface means connected to the telephone transmission line for answering and disconnecting the system from the transmission line. A plurality of sensors are also used for simultaneously sensing a plurality of separate conditions. System control means, such as a computer, for example, responsive to digital code number signal interrogate at least one specified sensor means corresponding to the count and generate an audible signal on the telephone transmission line which is indicative of the condition sensed by the specified sensor means.

In one particular embodiment of the invention, the plurality of sensor means sense the input of mail to separate mailboxes. The system control means memorizes this sensor information. The digital code number signal from the multifrequency signal decoder or from the count in the counter means is used to identify the calling party and represents a particular mailbox. The audible signal from the computer means is a vocalized signal indicating the state of the sensed condition, i.e. whether or not mail has been put into the particular mailbox represented by the code number.

It is, therefore, an object of the present invention to provide a telephone remove enquiry system for use with both dial-type and push button type telephones.

It is another object of the invention to provide by means of the telephone lines an automatic instant response to a mailbox renter's enquiry as to his mailbox status.

It is still another object of the invention to provide a remote enquiry system utilizing the telephone transmission lines which accurately detects and counts pulses from dial-type telephones and rejects noise pulses.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
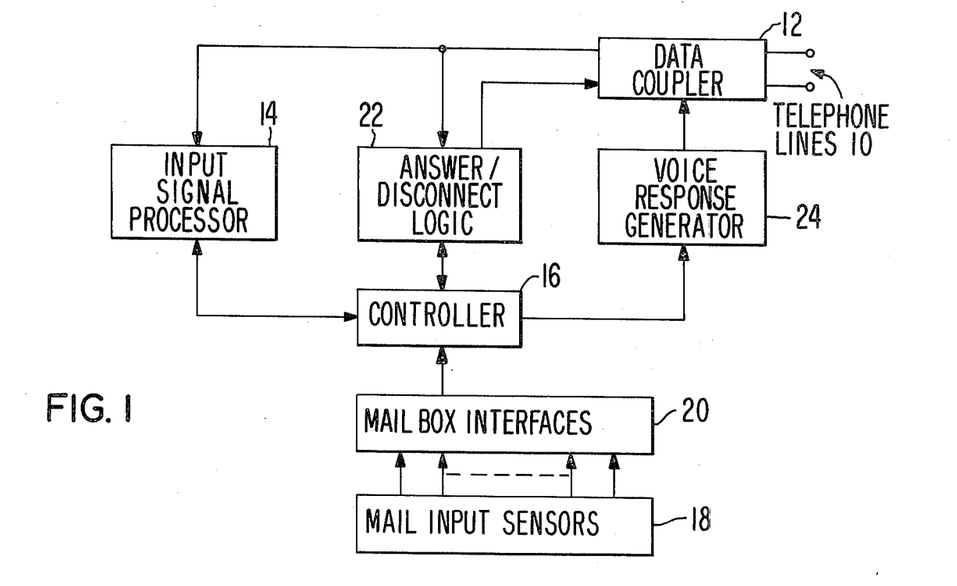
FIG. 1 is a block diagram of the telephone enquiry system according to the invention.

Referring now more particularly to FIG. 1, a telephone transmission line pair 10 is connected at the receiving or system end to a data coupler unit 12. Such a data coupler is a protective data communication arrangement which is provided by the telephone company and therefore will not be described in greater detail. This coupler is optional. The output of the data coupler is fed to an input signal processor unit 14. The input signal processor unit converts dial pulses or multifrequency Touch Tone type telephone signals to digital signals for communicating with a system controller 16, which can be a computer, for example. The controller 16 is connected to a plurality of mailbox input sensors 18 through a mailbox interface unit 20. The mailbox input sensors are capable of sensing the depositing of mail in separate ones of a plurality of boxes. Such mailbox input sensors can take a variety of forms, including microswitches, electromagnetic sensors, or an array of light beams which activate photocell detectors. See, for example, U.S. Pat. Nos. 3,171,116, 3,611,333 and 2,968,804. In general, the sensors are arranged in an array of columns and rows so that activation of a row and a column sensor provides a pair of signals which discretely identify the particular mailbox. In other embodiments, however, discrete sensors can be used for each box. Since the mailbox sensors can take any one of a variety of forms and since they are not particularly pertinent to the concept of the invention, they will not be described in greater detail.

The controller 16 is also connected to an answer/disconnect logic unit 22 which, upon command from the controller, will both answer the incoming telephone call from the subscriber and disconnect the system from the telephone line at the completion of the operation. The controller 16 audibly indicates to the subscriber over the telephone lines the status of the subscriber's mailbox by means of a voice response generator 24 which gives a vocal indication of the mailbox status. The voice response generator can take any of a variety of forms, such as recorded magnetic tape player of a voice synthesizer, for example. Such voice response generators are well known in the art. See, for example, U.S. Pat. Nos. 3,102,165, 3,183,303, 3,641,496 and 3,892,919.

In operation, the system provides automatic, instant response to a mailbox renter's telephonic enquiry about his mailbox status. At the mailbox site, one or more telephones with the data couplers are installed. These telephones and the system may be reached by dialing the same telephone number. To enquire about a mailbox status, the box renter calls this number and, when the data coupler and answer/disconnect logic answer the call, the renter then dials or "push-buttons" (for a Touch Tone phone) his mailbox code number after the connection is made. The system then checks the status of the mailbox in question and informs the caller vocally by the voice response generator 24 about the status of the subscriber's box.

One purpose in using the computer is because of its memory capability and fast response. When mail is deposited into the mailboxes, the corresponding sensors for each box are activated and signal the mailbox interface unit 20. The mailbox interface unit output updates the computer information in memory as to the box status. When the box renter calls up the system to enquire about his box status, the caller also has an option to have the box status cleared from memory if he decides to empty his box in the immediate future. Another approach is to have a switch associated with each mailbox door for re-setting the system when the box has been opened and the contents taken out of the mailbox. The operation steps in the system during the processing are synchronized and coordinated through a sequential network control program in the computer. This sequence involves four states: idling, initial message, counting, and search and respond.

Figure 2:
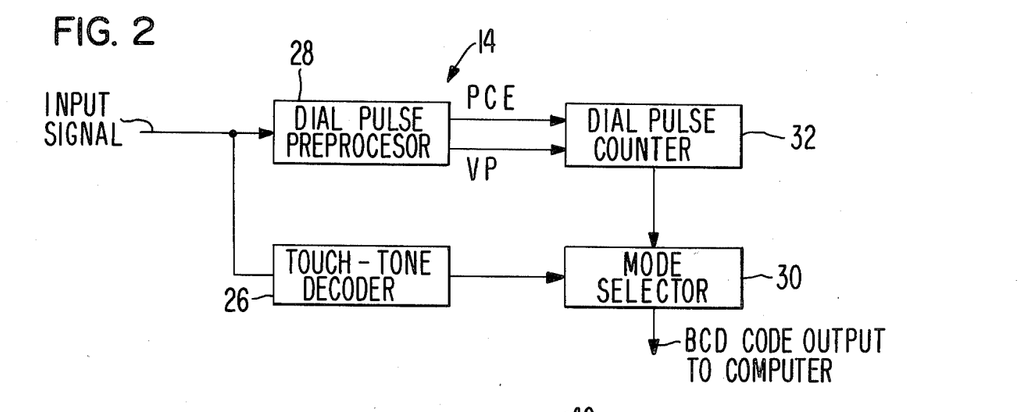
FIG. 2 is a block diagram of the input signal processor unit of the system depicted in FIG. 1.

Referring now more particularly to FIG. 2, the input signal processor is capable of converting both dial and pushbutton signals to binary coded decimal (BCD) codes. This makes it possible for any telephone, whether of the rotary dial-type or the Touch Tone type to communicate with the controller 16 without the need of additional equipment at the calling party end. Heretofore, in some systems, in order to provide some means of identification for the caller, it has been necessary for the caller to possess special multifrequency tone generators, for example, which then produce over the telephone line some sort of identifying tone signal coded by frequency. This is not necessary in the present system.

The input signal processor includes a Touch Tone type signal decoder unit 26 whose input is supplied from the data coupler 12. Also supplied with the output of the data coupler 12 is a dial pulse processor (DPP) unit 28. The output of the Touch Tone decoder 26 is fed to a mode selector 30 also receives an input from a dial pulse counter (DPC) 32 connected to the output of the DPP unit 28. The mode selector gates one of the outputs from the DPC 32 or the Touch Tone decoder and supplies a BCD output signal to the controller 16 which is representative of the subscriber's code number.

The mode, that is whether dial or Touch Tone, is originally set to be the pulse mode to receive dial signals. It changes to Touch Tone mode when a valid Touch Tone signal is detected by the Touch Tone decoder 26.

This can be accomplished because the liklihood is extremely small that a continuous multifrequency signal lasting for a duration of more than, say 30 milliseconds, is an invalid signal. Therefore, the mode selector and decoder determine if such a continuous multifrequency signal exists for such a period and if it does, then the output of the decoder is selected. This all occurs long before the dial pulse processor and counter will even have validated and counted one dial break and make period (approximately 100 milliseconds).

The DPC 32 is supplied with two signals from the DPP 28. One signal is the valid pulse (VP) signal. The VP is a discrete digital pulse. The other signal is the pulse count enable (PCE) control signal which signifies the beginning of a pulse train and enables the DPC 32 to count the number of valid pulses.

Figure 3:
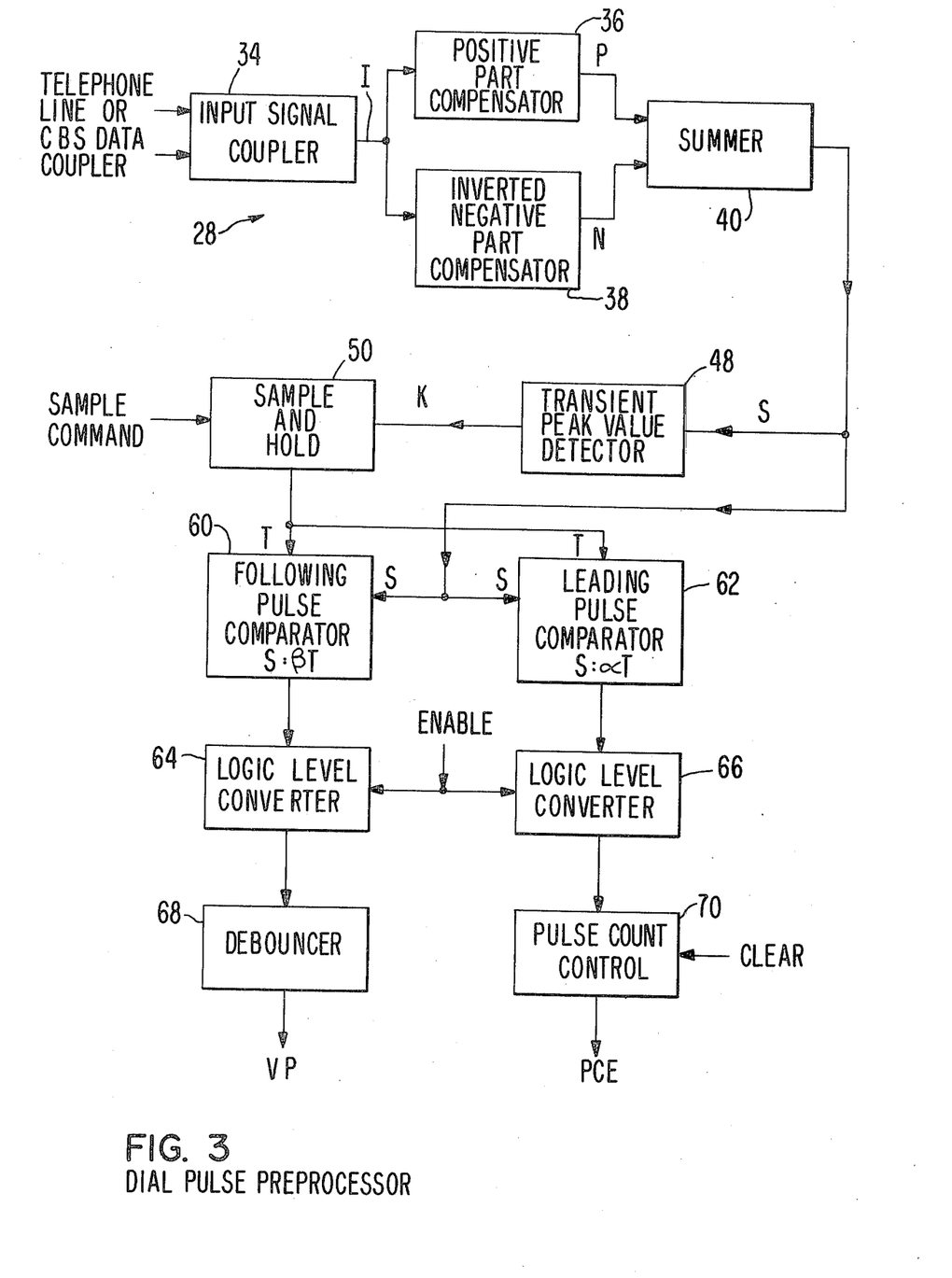
FIG. 3 is a block diagram of the dial pulse preprocessor unit depicted in the block diagram of FIG. 2.

Referring now more particularly to FIG. 3, the processing flow chart of the DPP 28 is illustrated. The input to the DPP 28 can be directly from the telephone line or indirectly through the data coupler 12. The input to the DPP is first supplied to an input signal coupler (ISC) 34 which provides balancing and bandpass effect (about 200 Hz to 700 Hz) to the incoming signal. The output of the ISC 34 is supplied to a positive part compensator 36 and an inverted negative part compensator 38. Both of these compensators 36 and 38 are, in effect, basically operational amplifiers which are arranged to detect and process the positive and negative parts, respectively, of the ISC output signal. More importantly, they also adjust the gains independently of each other to compensate for loss in the ISC and attempt to match the output level of each other. The output P from the positive part compensator 36 and the output N from the negative part compensator 38 are summed in a summer 40 to produce a combined signal S.

Figure 8A:
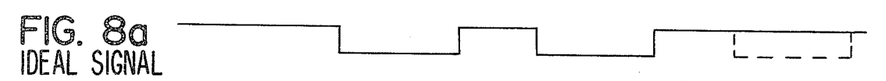
FIG. 8a, 8b, 8c, 8d, 8e, 8f, 8g, 8h, 8i, 8j, 8k, 8l, 8m, 8n, and 8o are waveform diagrams for use in explaining the operation of the invention.

At this point, it would be helpful to note that FIG. 8a depicts the "break" and "make", dc signal at the calling party end made by a dial-type telephone switch. Each break and make represents a single digit. Thus, if the calling party dials the numeral 3, then there will be three sets of break and makes. As will be explained in greater detail hereinafter, the timing of these breaks and makes is specified by the telephone company. This ideal rectangular wave signal at the dial telephone deteriorates along the transmission path so that what is actually received is a series of spike pulses representing each transition between the break and make and vice versa.

Figure 8B:
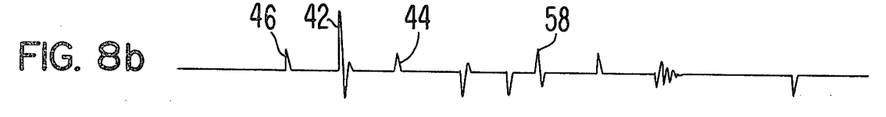
Figure 8C:
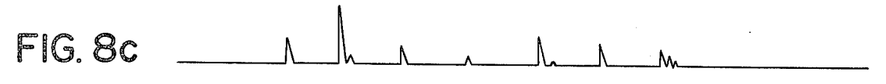
Figure 8D:
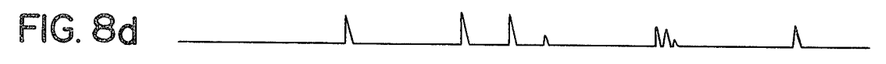
Figure 8E:
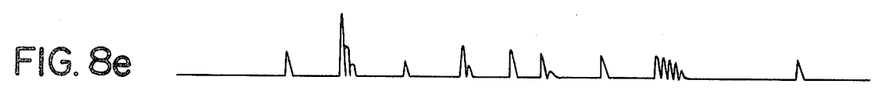

The waveform depicted in FIG. 8b corresponds to the output of the ISC 34. The waveform I depicted in FIG. 8b thus shows a positive and negative peak signal at 42 at the beginning of the first break of the dial switch. A following noise pulse signal 44 trails the pulse signal 42 and a leading noise pulse signal 46 precedes the pulse signal 42. The corresponding P and N outputs from the positive part compensator and the inverted negative part compensator 36 and 38, respectively, are depicted in FIGS. 8c and 8d, respectively. The resulting sum signal S from the summer 40 appears in waveform diagram 8e.

Figure 7:
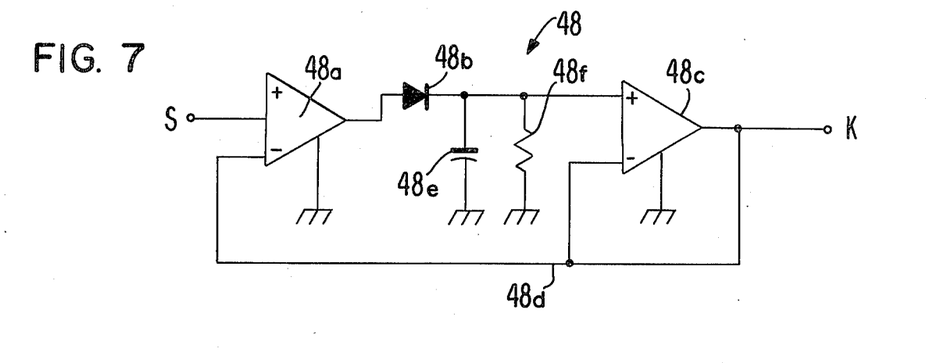
FIG. 7 is a schematic diagram of a transient peak value detector for use in the circuit depicted in FIG. 3.

The sum signal S is fed to a transient peak value detector 48 which is used to detect the instantaneous peak value of S and to sustain the peak value (at about 90% of the maximum value) for a very short period on the order of 1 millisecond and then let it drop very rapidly. The transient peak value detector is shown in FIG. 7 and comprises a differential amplifier 48a which receives the input signal S at a positive input. The output of amplifier 48a is supplied to the anode of a diode 48b whose cathode is connected to the positive input of a second differential amplifier 48c. The output of the amplifier 48c is a signal K which is fed back to the negative input terminals of the amplifiers 48a and 48c to thereby provide negative feedback. A resistor 48e is connected in parallel with a capacitor 48f between the circuit ground and the positive input to the amplifier 48c. The signal S is held in the capacitor 48f but is bled off by the resistor 48e. The values of the capacitor 48f and the resistor 48c are chosen so the signal will be held long enough for safe sampling but short enough that before the next pulse arrives the value will reduce to zero.

Figure 8F:
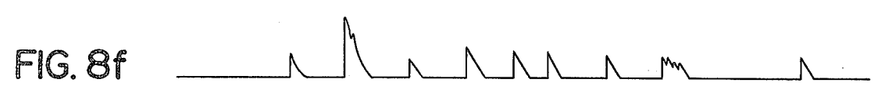

The waveform K is depicted in FIG. 8f. Effectively, the signal K represents the peak value of each incoming pulse at any time. A sample and hold circuit 50 is used to sample the signal K during the time a sample command (SC) signal is supplied to it and to hold the sampled value after the SC goes down. The SC is provided by the dial pulse counter module 32 as will be explained in greater detail hereinafter. The SC represents the time a valid pulse (VP) is expected. More specifically, it is equivalent to the Boolean equation T1+FFF·MNB·VP. The description of the symbols used in this Boolean equation will be provided later in this description but in effect, it represents the condition that the system is either first receiving the beginning of a pulse train (T1) or (+) a valid pulse (VP) is being received during the interval of first (FFF is true) minimum break (MNB is true). Throughout this description such Boolean formulae will be used to describe the states of the various logic modules depicted in the figures. It will be understood by those skilled in the art that when such an equation is true, it is the equivalent of a logic high signal whereas when the equation is false or not true, it is the equivalent of a logic low signal. The initial "ringing" signal received on the telephone lines 10 and 12 is converted by the answer/disconnect logic 22 to a logic signal which initializes the whole system, including a "clear" signal to the sample and hold circuit 50 to reset it to an initial condition.

Figure 8G:
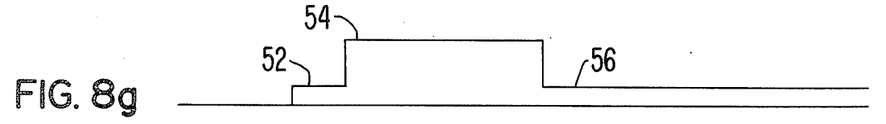

The output T from the sample and hold circuit 50 is shown in waveform diagram 8g. From this waveform it can be seen that the output T acquires a predetermined first amplitude 52 corresponding to the amplitude of the first noise pulse 46 and then jumps to a much higher amplitude 54, corresponding to the peak amplitude of the leading pulse 42 produced at the beginning of the first break. This amplitude 54 is then held throughout the entire cycle corresponding to the original break and the following make of the calling party dial telephone switch contacts. The waveform thereafter assumes a new amplitude 56, corresponding to the peak amplitude of a pulse 58 shown in waveform diagram 8b, representing the beginning of a second break.

Figure 8H:
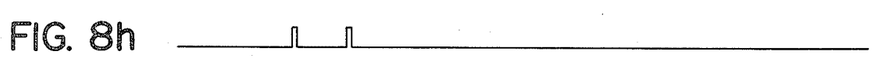
Figures 8I, 8J:
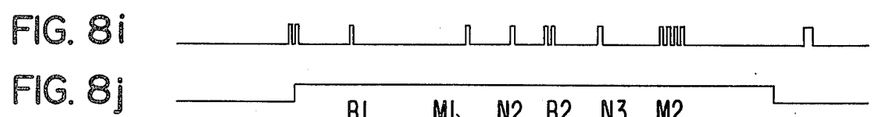

Referring again to FIG. 3, the output T from the sample and hold circuit 50 is supplied to a following pulse comparator 60 and to a leading pulse comparator 62 where it is used as a threshhold voltage which is then compared with the signal S. Two factors, however, are used in the comparison circuits. These factors are designated $\alpha$ and $\beta$ and their values are chosen and adjusted to achieve optimal reliability. Typically, $\alpha$ may be said to be 0.8 and $\beta$ to be 0.4. Thus if the amplitude S is 0.4 or 40% of the amplitude T, a pulse output F from the following pulse comparator circuit 60 will be supplied as shown in waveform diagram 8i. Similarly, if the amplitude of the signal S is 0.8 or 80% of the amplitude of the signal T, an output signal L will be supplied from the leading pulse comparator 62 as illustrated in waveform diagram 8h.

Figure 4:
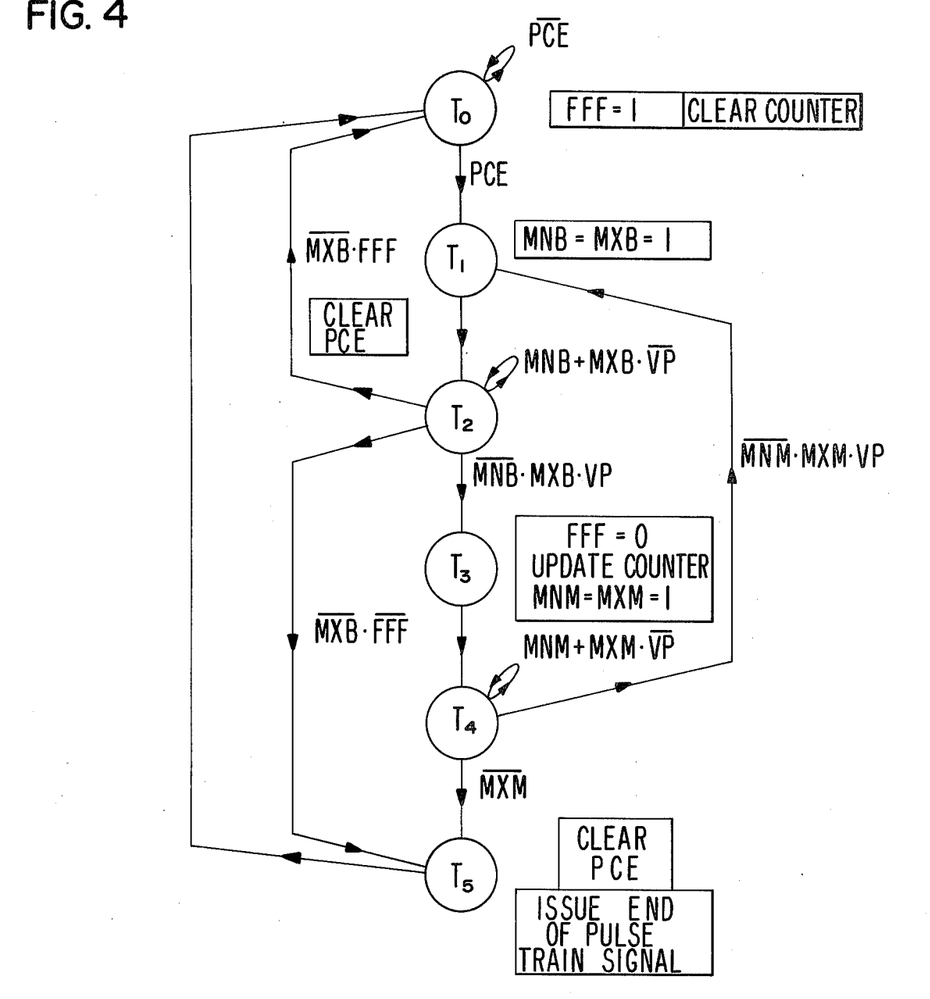
FIG. 4 is a state transition diagram for the logic elements of the dial pulse counter unit depicted in the block diagram of FIG. 2.
Figure 5:
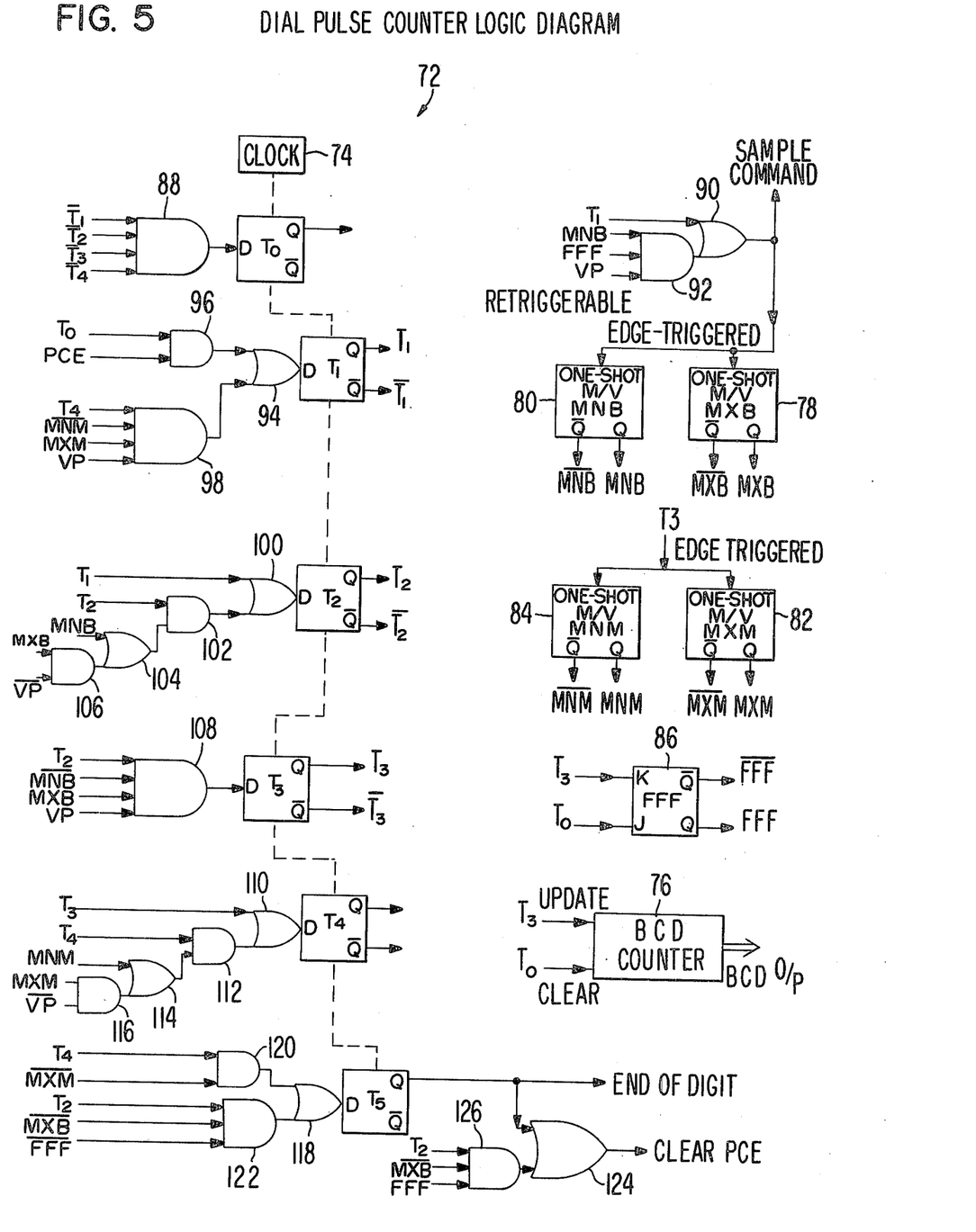
FIG. 5 is a logic diagram for the dial pulse counter unit depicted in the block diagram of FIG. 2.

The outputs F and L then go through separate logic level convertors 64 and 66, respectively, where the signals are converted down to the proper voltage level for operating the logic units. The logic level convertors 64 and 66 are enabled by an enable signal only when the main sequencer, to be described in greater detail with reference to FIGS. 4 and 5, is in a counting state. The voltage conversion is typically from about 15 to 12 volts down to approximately 5 volts.

The output of the logic level convertor 64 is fed to a debouncer 68 whose output signal is the VP. The debouncer 68 can consist of, for example, a monostable multivibrator preferably with a Schmitt-trigger input, such as Texas Instrument type SN 74121. It is used to remove "bouncing" and to form a data pulse. This produces a nicely trimmed waveform from bouncing signals. The debouncer is not intended to perform the function of a digital filter as is used in some prior art systems. The multiple output pulses from the debouncer are acceptable for either the beginning or the end of a break interval. The pulse width from the debouncer 68 may be adjusted to achieve satisfactory performance.

The output of the logic level convertor 66 is supplied to a pulse count control flip-flop 70 which is set when the leading pulse comparator 62 detects a valid leading pulse and is cleared when the main sequencer of the system control 16 is in a noncounting mode, or at the end of a pulse train, or when counting is aborted due to noise.

Referring now more particularly to FIGS. 4 and 5, the synchronized, dial pulse sequencer 72 is illustrated. For the purposes of this description, the interconnections of the various logic units of the dial pulse sequencer 72 have not been shown other than symbolically, for to do so otherwise would be unnecessarily complex and confusing. It will be understood that the dial pulse sequencer includes a series of D-type flip-flop units, T0, T1, T2, T3, T4 and T5 which are all synchronized by a clock 74. Each of these flip-flops T0 - T5, inclusive, is capable of providing either a true output or a not true output. The designations of true and nontrue outputs are in the conventional form, that is with a bar over the symbol to designate a not true output. The true outputs have been given the same designation as the designation for the element which produces them. In the state transition diagram of FIG. 4, the circles represent the flip-flops while in a true state. This state diagram thus depicts the sequential processing performed in the module of the dial pulse counter 32. The arrangement can be seen to follow a natural progression or sequence from the flip-flop T0 being true to the flip-flop T1 being true, etc. until flip-flop T5 is made true.

Through the sequential network 72 the VP output from the dial pulse preprocessor 28 is further verified according to timing requirements specified by the telephone company for the rotary dial-type telephone switches. The dial pulse counter 32 receives two input signals, as mentioned above, PCE and VP and furthermore has a BCD counter 76 to produce a BCD code corresponding to the dialed digit code number which represents the mailbox of the subscriber. The terms MXB, MNB, MXM and MNM correspond to the telephone company standards for the break and make time requirements for a dial telephone switch and have the following definitions:

MXB = maximum break time of the dial switch; 80 milliseconds.

MNB = minimum break time of dial switch; 53 milliseconds.

MXM = maximum make time of dial switch; 53 milliseconds.

MNM = minimum make time of dial switch; 33 milliseconds.

MXB and MNB are, in effect, the outputs of retriggerable one-shot monostable multivibrators 78 and 80, respectively. A Texas Instruments Model SN 74123 is suitable for this purpose, for example. MXM and MNM represent the outputs of nonretriggerable one-shot monostable multivibrators 82 and 84, respectively. They are triggered when flip-flop T3 is true and cannot be retriggered. A type J-K flip-flop 86, having a true output FFF, is used to facilitate different processing of leading pulses and following pulses. FFF of 86 is set to 1, i.e. is true, in the idling state when flip-flop T0 is true and is reset to 0, i.e. not true, when a valid pair of pulses VP have been detected.

Referring now to the waveform diagrams 8l, 8m, 8n and 8o, it can be seen that outputs MXB, MNB are true when the multivibrators 78 and 80 are triggered and they remain true for specified times as referred to above corresponding to the maximum break and minimum break times as specified by the telephone company. They become not true at the end of the specified times. As will be explained in greater detail hereinafter, the multivibrators 78 and 80 are triggered by a valid pulse. If a second pulse comes in between the times that MNB is not true and MXB is true, i.e. within the period between 53 and 80 milliseconds after the first pulse, then in all probability this second pulse is a valid pulse representing the making of the contacts after a break. This condition is set forth in the Boolean equation $\overline{MNB} \cdot MXB$.

Similarly, the outputs MXM and MNM of the multivibrators 82 and 84, respectively, are triggered by a valid pulse received during the time $\overline{MNB} \cdot MXB$. The output MNM becomes not true 33 milliseconds later and the output MXM becomes not true 53 milliseconds later. A pulse arriving during the time between $\overline{MNM}$ and MXM is therefore, in all probability, a valid leading pulse representing the beginning of a subsequent break period after a preceding break period.

Figure 8K:
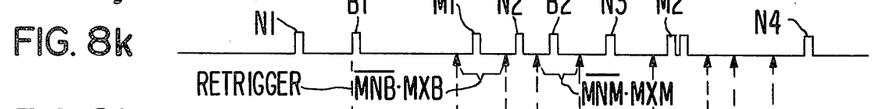
Figure 8L:
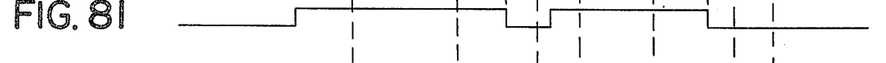
Figure 8M:
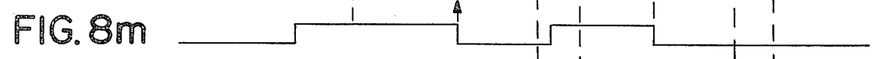
Figure 8N:
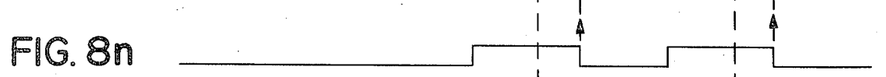
Figure 8O:
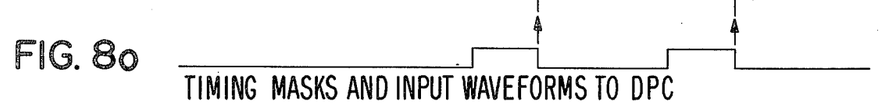

Referring to the VP waveforms in FIG. 8k and the logic state diagram of FIG. 4, the counter sequential control is activated by PCE going true, as shown in FIG. 8j. This is produced by the first noise pulse 46 as depicted in FIG. 8b.

With the onset of the PCE the state of the main sequencer is changed from T0 being true to T1 being true. In logic diagram form this is the equivalent of the output of an AND gate 88 being supplied to the input of the flip-flop T0. The AND gate 88 has inputs of $\overline{T1}$, $\overline{T2}$, $\overline{T3}$ and $\overline{T4}$ from the corresponding flip-flops. The input to the flip-flop T1 is the output of an OR gate 94, one of whose inputs is the output of an AND gate 96. The AND gate 96 has two inputs, T0 and PCE. This is the logic equivalent of PCE·T0, shown simply as the line "PCE" between state T0 and T1 in FIG. 4. The other input to the OR gate 94 is the output of an AND gate 98 whose inputs are T4, $\overline{MNM}$, MXM and VP. This is the logic equivalent of T4·$\overline{MNM}$·MXM·VP, shown as the direct line between state T4 and state T1 in FIG. 4. Thus, PCE and T0 together trigger T1, which in turn, turns off T0.

In this example, the same input signal 46 which triggers the PCE also generates a valid pulse N1, shown in waveform diagram 8k. This produces the output signal T1 true which triggers the multivibrators 78 and 80 to cause MXB and MNB to be true as illustrated in the waveforms in FIGS. 8l and 8m. In logic diagram form the inputs to the multivibrators 78 and 80 are the output of an OR gate 90, one of whose inputs is the output of the flip-flop T1 and the other of whose inputs is the output of an AND gate 92. The inputs to the AND gate 92 are the signals MNB, FFF (from the flip-flop 86) and VP. The input from the flip-flop T1 to the OR gate 90 results from the pulse N1.

With the pulse N1, and the triggering of the multivibrators 78 and 80 to produce MXB and MNB, control next transfers on the next clock pulse into the flip-flop T2 which becomes true to wait for the drop of the signal MNB from the multivibrator 80. Arriving before MNB drops, B1 (i.e. leading pulse of first break), a valid signal pulse, invalidates the noise pulse N1, and retriggers the multivibrators 78 and 80 to retain the signals MXB and MNB true and extend their times. Another valid signal pulse M1 (i.e. leading edge of first make) arrives during the right time interval after MNB goes down while MXB is still up, that is between the minimum and maximum break times ($\overline{MNB}$·MXB), to initiate the transition from state T2 to T3. This transition is from the condition that the flip-flop T2 output is true to the condition where the flip-flop T3 output is true and the flip-flop T2 output is not true.

This transition verifies the reception of both the beginning and the end of the first DC interruption or break. Since one of the inputs to the FFF flip-flop 86 is the output of flip-flop T3, the FFF flip-flop 86 is thus reset to 0 and the counter 76, which is also supplied with the output of T3, is incremented from 0 to 1. Simultaneously, the timing masks represented by the outputs MXM and MNM from the multivibrators 82 and 84 are triggered to verify the arrival time of the next signal pulse which should be the end of the first make. Control then transfers into state T4, that is the output of the flip-flop T4 is true, when the next clock pulse from the clock 74 arrives. Control remains in the flip-flop T4 to wait for the drop of the signal MNM and the arrival of the next VP.

Arriving before the signal MNM drops, a noise pulse N2 is simply ignored by the logic circuitry. The next signal pulse B2 (i.e. beginning of second break) arrives during the right time interval as represented by $\overline{MNM}$·MXM, that is between the minimum make and the maximum make times to initiate the looping of control from the state where the output of the flip-flop T4 is true back to the state where the output of the flip-flop T1 is true. The logic element interconnections which carry out these steps will be explained in greater detail hereinafter.

The signals MXB and MNB are again triggered by the output of the flip-flop T1 fed into the OR gate 90. Control transfers to the flip-flop T2 when the next clock pulse from the clock 74 arrives. A noise pulse N3, arriving before the signal MNB drops, is simply ignored during the time T2 is true. A multiple signal pulse M2 (i.e. beginning of the second make), arriving during the time interval $\overline{MNB}$·MXB, that is between the minimum and maximum break times after the pulse B2, initiates the transfer from the state T2 to T3, and increments the counter 76 by 1, and further triggers the multivibrators 82 and 84 so that the signals MXM and MNM are true. Control then transfers to the flip-flop T4.

No more pulses come before the signal MXM drops, and thus control is transferred to the flip-flop T5 which resets the signal PCE and issues an end of digit (i.e. end of pulse train) signal, and then cycles back to the flip-flop T0 to wait for another pulse train. In FIG. 8k the noise pulse N4 comes without a true PCE, and is simply ignored during the state T0. This represents the case where a leading noise is strong enough to overcome the following pulse comparator 60 to generate a VP signal but is not strong enough to overcome the leading pulse comparator 62 to raise the PCE command.

With reference to the FIG. 4, special treatments of noise can be seen by the branches representing the transition from T2 to T0 and from T2 to T5. If no VP comes along before the signal MXB drops, then control transfers to T0 if the flip-flop 86 (FFF) is high, i.e. no pair of pulses has been received, thereby rejecting a leading noise, and to flip-flop T5 if FFF is low, i.e. indicating a pair of pulses has been received, thereby rejecting a trailing noise pulse.

The FIG. 5, as explained above, is an example of the logic counterpart of the sequential states, T0 – T5 illustrated in FIG. 4. The inputs to the various flip-flops represent the state transition enable logic, as was briefly referred to in describing the operation of flip-flops T0 and T1. The input to the flip-flop T2 is the output of an OR gate 100, one of whose inputs is the output of an AND gate 102. One input to the AND gate 102 is the output of the flip-flop T2 and the other input to the AND gate 102 is the output of an OR gate 104. One input to the OR gate 104 is the signal MNB and the other input to the OR gate 104 is the output of an AND gate 106 whose inputs are MXB and $\overline{VP}$. The logic equation represented by these elements is simply T1 + T2·(MNB + MXB·$\overline{VP}$), as illustrated by the corresponding transition lines to state T2 shown in FIG. 4.

Similarly, the input to the flip-flop T3 is the output of an AND gate 108 whose inputs are T2, $\overline{MNB}$, MXB and VP, the logic equivalent of T2·$\overline{MNB}$·MXB·VP. The input to the flip-flop T4 is the output of an OR gate 110 whose inputs are the signals T3 or the output of an AND gate 112 whose inputs are the signal T4 and the output of an OR gate 114. The inputs to the OR gate 114 are the signals MNM or the output of an AND gate 116 whose inputs are MXM and $\overline{VP}$. This represents the logic condition of T3 + T4·(MNM + MXM·$\overline{VP}$) indicated by FIG. 4.

The input to the flip-flop T5 is the output of an OR gate 118 whose inputs are, respectively, the outputs of an AND gate 120 and 122. The inputs to the AND gate 120 are the signals T4 and $\overline{\text{MXM}}$. The inputs to the AND gate 122 are the signals T2, $\overline{\text{MXB}}$ and $\overline{\text{FFF}}$. These represent the two conditions under which state T5 is entered, namely T4·$\overline{\text{MXM}}$ (pair of dial VPs received followed by no other VP) and T2·$\overline{\text{MXB}}$·$\overline{\text{FFF}}$ (no VP before MXB drops and FFF is low, indicating a pair of valid signal pulses has been received, to reject trailing noise pulses). The output of the flip-flop T5 constitutes the end of digit signal which is fed to one input of an OR gate 124. The output of the OR gate 124 is the clear PCE signal which is supplied to the pulse count control flip-flop 70 shown in FIG. 3. The other input to the OR gate 124 is the output of an AND gate 126 whose inputs are T2, $\overline{\text{MXB}}$ and FFF. Thus, "clear PCE" is generated either by T5 or when T2·$\overline{\text{MXB}}$·FFF representing the condition that no VP is received before MXB drops and FFF is high, indicating that a pair of valid signal pulses has not been received, to reject leading noise. This is shown as the line from T2 to T0 in FIG. 4.

The dial pulse counter described above checks for both leading and trailing pulses for each DC break of the dial telephone switch. It may also be desirable in less advantageous embodiments to check the validity of only the leading pulses if the input signals are subject to drastic attenuation in the transmitting process such that the trailing pulse of the last DC break may be too weak to be detected. In such embodiments, one can have both leading and trailing pulses of the first or the first N number of DC breaks checked, while checking only the leading pulses for the remainder of the pulse train.

Figure 6:
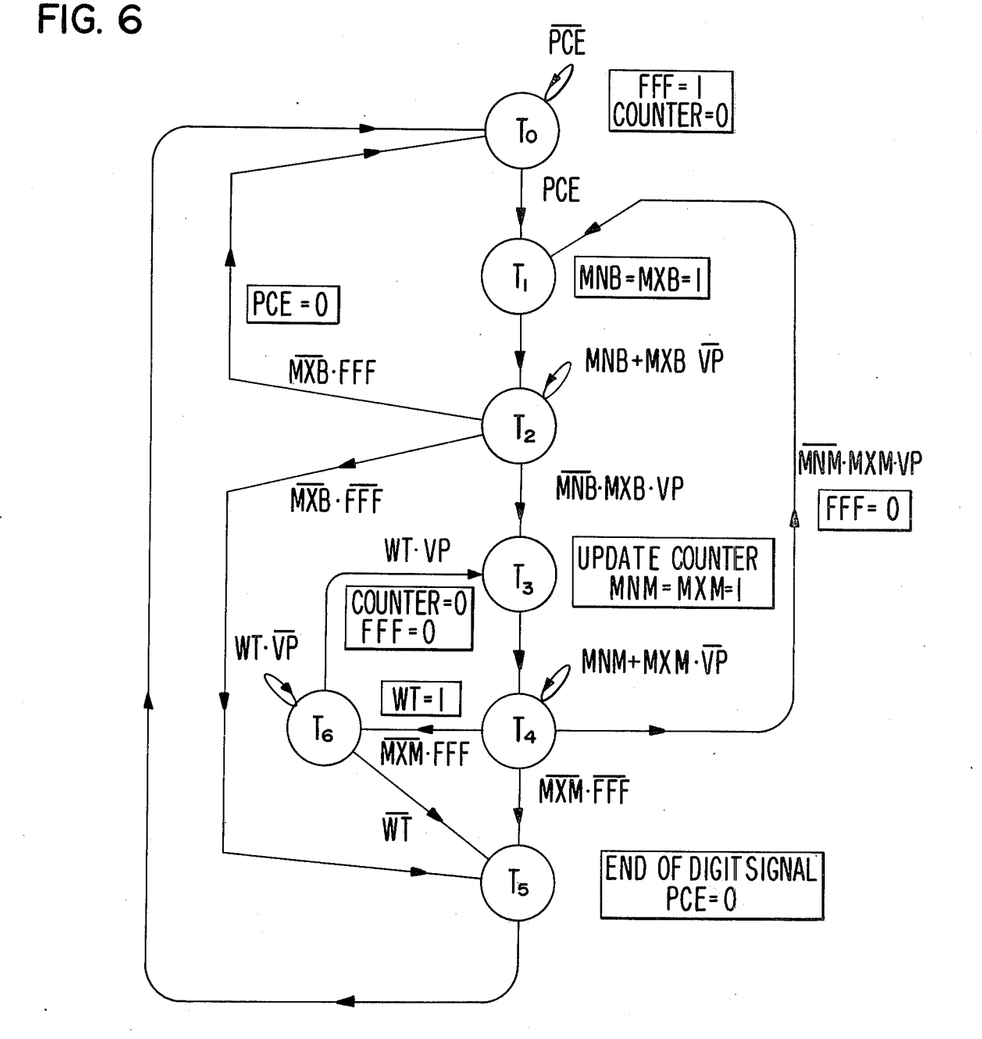
FIG. 6 is a state transition diagram of a modification of the dial pulse counter state transition diagram depicted in FIG. 4 for applications requiring extreme reliability.

Referring now more particularly to FIG. 6, in the case that a noise signal N arrives before and is separated from a pulse train by a time interval BT, where MNB<BT<MXB, and no other pulses arrive within the time period BT, then the pulse N and the subsequent leading pulse of the train would be mistaken by the dial pulse counter as a valid pair of pulses representing the first DC break period of a given digit. This would foul up subsequent efforts by the dial pulse counter in verifying the pulses coming along in the same pulse train and might result in an erroneous count. The chance of this situation occurring is quite remote. In applications requiring extreme reliability, however, a modified sequential control can be implemented to detect this case and achieve correct counting. Essentially, this requries the addition of a waiting state T6 to the sequencer 72. During the state when T4 is true, if the signal MXM drops before another VP comes along, the state T5 is entered. The processing of this case is modified if it is the first time through the state T4 for a pulse train (i.e. FFF true). Instead of the state T5, a waiting state T6 is entered. The waiting time (WT) is set to be the difference between the maximum break and make (MXB-MXM) periods. If no VP arrives during the time WT, it is recognized as the case of digit 1, and state T5 is entered. If a VP arrives during WT, the counter 76 and FFF are reset to 0 and state T3 is re-entered where the counter will be incremented to 1. The last case represents the detection and correction of a solitary, leading, timely noise pulse. The state diagram, and its corresponding logic circuitry, of FIG. 4, is also somewhat altered in respect to the operation of flip-flop FFF. In the FIG. 6 embodiment, FFF is not cleared in state T3 because it is needed for state T6. Instead FFF is cleared before entering state T3 from state T6 or before entering state T1 from state T4. This is necessary to prevent the circuit from becoming trapped in a loop.

The logic elements necessary to carry out these state transitions will be apparent to those skilled in the art and are derived in the same manner as was done for the logic elements described in FIG. 5 (representing FIG. 4). They will, therefore, not be described in detail.

While in the above description the system is referred to as a remote telephonic enquiry system for sensing the status of a mailbox, it is clear that the system has a multitude of other uses for determining either the status of a condition or for determining the presence or absence of information at a central source for a specified calling party who is identified by a digital code produced either by a dial-type telephone or a Touch Tone telephone. The system is not limited simply to sensing the status of a physical condition but may also be used to locate or receive information stored at a central source. Such information could be prerecorded, for example, such as an answering service.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved telephone remote enquiry system of the type which automatically answers a telephone call from a dial type or push-button type telephone and thereafter responds to a code number signal transmitted over the telephone lines by the calling party, wherein the improvement comprises:

multifrequency decoder means for detecting whether the code number signal is in the form multifrequency signals from a push button type telephone and for decoding any such multifrequency signals into a binary coded decimal output representative of the code number signal, dial pulse counter means for counting dial telephone produced pulses to generate a binary coded decimal output representative of the code number signal, mode selector means for determining whether the code number signal is in the form of dial pulses or multifrequency signals and for selecting the appropriate binary coded decimal output of either the multifrequency decoder means or the dial pulse counter means, system control means activated by the binary coded decimal output signal from the mode selector means for providing an audible response over the telephone lines to the calling party which is specific to the code number signal, and wherein the dial pulse counter means further includes dial pulse processing and counting means for detecting and counting dial pulse signals over noise pulses, the dial pulse processing and counting means including, first means for detecting the first leading pulse of a train by checking whether the next subsequent pulse occurs within a predetermined time period thereafter, second means for comparing the amplitudes of all subsequent pulses with a first fixed percentage of the amplitude of the immediately preceding pulse and qualifying as valid all such pulses whose amplitudes exceed the first fixed percentage, third means for restarting the first means if the amplitude of the next valid pulse occurs before the expiration of the predetermined time period following the receipt of the first leading pulse, the third means repeating this procedure in iterative fashion until the first leading pulse is finally determined by the receipt of a subsequently occurring valid pulse at the end of the predetermined time period with no intervening valid pulses, and fourth means for counting pairs of valid pulses which occur with predetermined timed relationships with respect to the finally determined leading pulse and for generating an output signal representative of the count.

2. An improved telephone remote enquiry system as recited in claim 1 further comprising sensor means for sensing a plurality of conditions, and for producing signals corresponding thereto, each condition corresponding to a separate code number signal and wherein the system control means is responsive to the sensor means and stores the signals representing the status of the condition corresponding to the code number signal represented by the binary coded decimal output, the system control means, upon receipt of the binary coded decimal output from the counter means providing the audible response to the calling party which is indicative of the status of the condition represented by the code number.

3. An improved telephone remote control system as recited in claim 2 wherein the plurality of sensor means sense the input of mail to separate mailboxes, the system control means memorizes this information for each mailbox, and the count in the fourth means represents a particular mailbox.

4. An improved telephone remote control system as recited in claim 2 wherein the audible signal from the system control means is a vocalization of the state of the sensed condition.

5. An improved telephone remote control system of the type in which one of a plurality of electrically operated apparatuses is remotely activated by a preselected combination of pulses in a pulse train recived over a telephone transmission line produced by the making and breaking of the switch contacts of a dial type telephone, wherein the improvement comprises input signal processing means including, first means for detecting the first leading pulse of a train by checking whether the next subsequent pulse occurs within a predetermined time period thereafter, second means for comparing the amplitudes of all subsequent pulses with a first fixed percentage of the amplitude of the immediately preceding pulse and qualifying as valid all such pulses whose amplitudes exceed the first fixed percentage, third means for restarting the first means if the amplitude of the next valid pulse exceeds this first fixed percentage and occurs before the expiration of the predetermined time period following the receipt of the first leading pulse, the third means repeating this procedure in iterative fashion until the first leading pulse is finally determined by the receipt of a subsequently occurring valid pulse at the end of the predetermined time period, and with no intervening valid pulses, and fourth means for counting pairs of valid pulses which occur with predetermined timed relationships with respect to each other and with respect to the finally determined leading pulse and for generating an output signal representative of the count.

6. An improved telephone remote control system as recited in claim 1 further comprising fifth means for comparing the amplitude of the leading pulse of the next subsequent pulse train with a second fixed percentage of the amplitude of the last preceding valid pulse.

7. An improved telephone remote control system as recited in claim 5 further comprising interface means connected to the telephone transmission line for answering and disconnecting the system from the transmission line, a plurality of sensors for simultaneously sensing a plurality of separate conditions, system control means responsive to the count output signal from the fourth means for interrogating at least one specified sensor means corresponding to the count and for generating an audible output signal on the telephone transmission line which is indicative of the condition sensed by the specified sensor means.

8. An improved telephone remote control system as recited in claim 7 wherein the input signal processing means includes means for detecting multifrequency signals from a pushbutton type telephone and for converting such signals into digitally coded signals.

9. An improved telephone remote control system as recited in claim 5 wherein the fourth means includes a BCD counter, first retriggerable timing mask means for generating an output signal which increments the BCD counter by one whenever a pair of valid pulses are received which are spaced apart by a period of time which is greater than the minimum standard break time for dial telephones and less than the maximum standard break time for dial telephones, second timing mask means triggered by the first timing mask means for detecting the occurrence of a valid pulse at a period of time after the incrementing output signal from the first retriggerable timing mask means which period of time is greater than the minimum standard make time for dial telephones and less than the standard maximum make time for dial telephones, the second timing mask means retriggering the first timing mask means upon the detection of such a valid pulse.

10. An improved telephone remote control system as recited in claim 9 wherein the first timing mask means further includes solitary leading noise (SLN) rejection means for detecting the occurrence of a valid pulse following the first counted pair of valid pulses and occurring within a time period thereafter equal to the difference between the standard time periods for a break and a make for a dial telephone, the SLN rejection means, upon the detection of said valid pulse, triggering the second timing mask means and resetting the BCD counter to zero.

* * * * *